United States Patent
Rego et al.

(10) Patent No.: US 11,808,136 B2
(45) Date of Patent: Nov. 7, 2023

(54) THROUGH-TUBING, CASED-HOLE SEALED MATERIAL EVALUATION USING ACOUSTIC MEASUREMENTS

(71) Applicant: Halliburton Energy Services, Inc., Houston, TX (US)

(72) Inventors: Pablo Vieira Rego, Rio de Janeiro (BR); Randolph S. Coles, New Caney, TX (US); Jeffrey James Crawford, Katy, TX (US); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 224 days.

(21) Appl. No.: 17/303,380

(22) Filed: May 27, 2021

(65) Prior Publication Data
US 2022/0381138 A1    Dec. 1, 2022

(51) Int. Cl.
*E21B 47/005* (2012.01)
*G01V 1/46* (2006.01)
*G01V 1/50* (2006.01)

(52) U.S. Cl.
CPC .............. *E21B 47/005* (2020.05); *G01V 1/46* (2013.01); *G01V 1/50* (2013.01); *G01V 2210/542* (2013.01); *G01V 2210/62* (2013.01)

(58) Field of Classification Search
CPC ... E21B 47/005; G01V 1/50; G01V 2210/542
See application file for complete search history.

(56) References Cited

U.S. PATENT DOCUMENTS

| 4,703,427 A | 10/1987 | Catala et al. |
| 4,928,269 A | 5/1990 | Kimball et al. |

(Continued)

FOREIGN PATENT DOCUMENTS

| EP | 2494380 A2 | 9/2012 |
| GB | 2607134 | 11/2022 |

(Continued)

OTHER PUBLICATIONS

"PCT Application No. PCT/US2022/025972, International Search Report and Written Opinion", dated Jul. 26, 2022, 11 pages.

(Continued)

*Primary Examiner* — Ian J Lobo
(74) *Attorney, Agent, or Firm* — DELIZIO, PEACOCK, LEWIN & GUERRA

(57) ABSTRACT

A method for evaluating a sealing material positioned between a casing of a wellbore and a subsurface formation in which the wellbore is formed includes emitting an acoustic waveform outward from a position within the casing and detecting a return waveform that is generated in response to the acoustic waveform interacting with a region of interest that includes at least a portion of the sealing material. The method includes determining a first time window of the return waveform associated with the region of interest and trimming the return waveform based on the first time window. The method further includes determining a first spectral power density for the first time window of the trimmed return waveform and determining a composition ratio for the region of interest based on the first spectral power density.

18 Claims, 9 Drawing Sheets

(56) References Cited

U.S. PATENT DOCUMENTS

| | | | |
|---|---|---|---|
| 5,036,496 A * | 7/1991 | Rutledge | G01V 1/50 |
| | | | 181/105 |
| 5,741,962 A | 4/1998 | Birchak et al. | |
| 9,477,002 B2 | 10/2016 | Miller et al. | |
| 9,823,375 B2 | 11/2017 | Nakajima et al. | |
| 9,945,974 B2 * | 4/2018 | Quintero | G01V 1/50 |
| 10,036,242 B2 | 7/2018 | Stokely et al. | |
| 10,067,262 B2 | 9/2018 | Quintero et al. | |
| 10,273,797 B2 | 4/2019 | Li et al. | |
| 2006/0233048 A1 | 10/2006 | Froelich et al. | |
| 2014/0052376 A1 | 2/2014 | Guo et al. | |
| 2015/0168580 A1 | 6/2015 | Prioul et al. | |
| 2016/0138386 A1 | 5/2016 | Stokely et al. | |
| 2016/0341842 A1 | 11/2016 | Bammi et al. | |
| 2018/0023383 A1 | 1/2018 | Hori et al. | |
| 2019/0100993 A1 | 4/2019 | Sullivan et al. | |
| 2019/0331820 A1 | 10/2019 | Goodman et al. | |
| 2021/0032973 A1 | 2/2021 | Gkortsas et al. | |

FOREIGN PATENT DOCUMENTS

| | | |
|---|---|---|
| RU | 2661747 C2 | 7/2008 |
| WO | 9935490 | 7/1999 |
| WO | 2009086279 A2 | 7/2009 |
| WO | 2017156292 A1 | 9/2017 |

OTHER PUBLICATIONS

"GB Application No. 2117693.8, Combined Search and Examination Report", dated May 26, 2022, 5 pages.

* cited by examiner

| GEOMETRY | SCHEME 408 | WELLBORE [in] 410 | PROPERTIES 412 | | INNER TUBING 414 | CASING 416 |
|---|---|---|---|---|---|---|
| TT1 402 |  | 8.5" | Weight [ppf] | | 9.3 | 26.0 |
| | | | OD [in] | | 3.5 | 7.0 |
| | | | ID [in] | | 2.992 | 6.276 |
| TT2 404 |  | 12.25" | Weight [ppf] | | 13.5 | 47.0 |
| | | | OD [in] | | 4.5 | 9.625 |
| | | | ID [in] | | 3.920 | 8.681 |
| TT3 406 |  | 14.75" | Weight [ppf] | | 17.0 | 85.3 |
| | | | OD [in] | | 5.5 | 10.750 |
| | | | ID [in] | | 4.892 | 9.156 |

THROUGH-TUBING, CASED-HOLE SEALED MATERIAL EVALUATION USING ACOUSTIC MEASUREMENTS

BACKGROUND

The disclosure generally relates to evaluating completed wellbores and, more particularly, to cased-hole evaluation using acoustic measurements.

In completed wellbores, pouring or flowing of sealing material (such as cement) in an annulus between a casing and the surrounding subsurface formation can be important for ensuring support of a casing in the wellbore, protection of the casing and tools within the wellbore from fluid corrosion, zonal isolation for hydraulically fractured wells, and effective plug and abandonment operations. After pouring or flowing the sealing material in the annulus, this sealing material can be evaluated based on downhole measurements to determine its various attributes (e.g., quality, quantity, etc.).

BRIEF DESCRIPTION OF THE DRAWINGS

Embodiments of the disclosure may be better understood by referencing the accompanying drawings.

DESCRIPTION OF EMBODIMENTS

Figure 1:
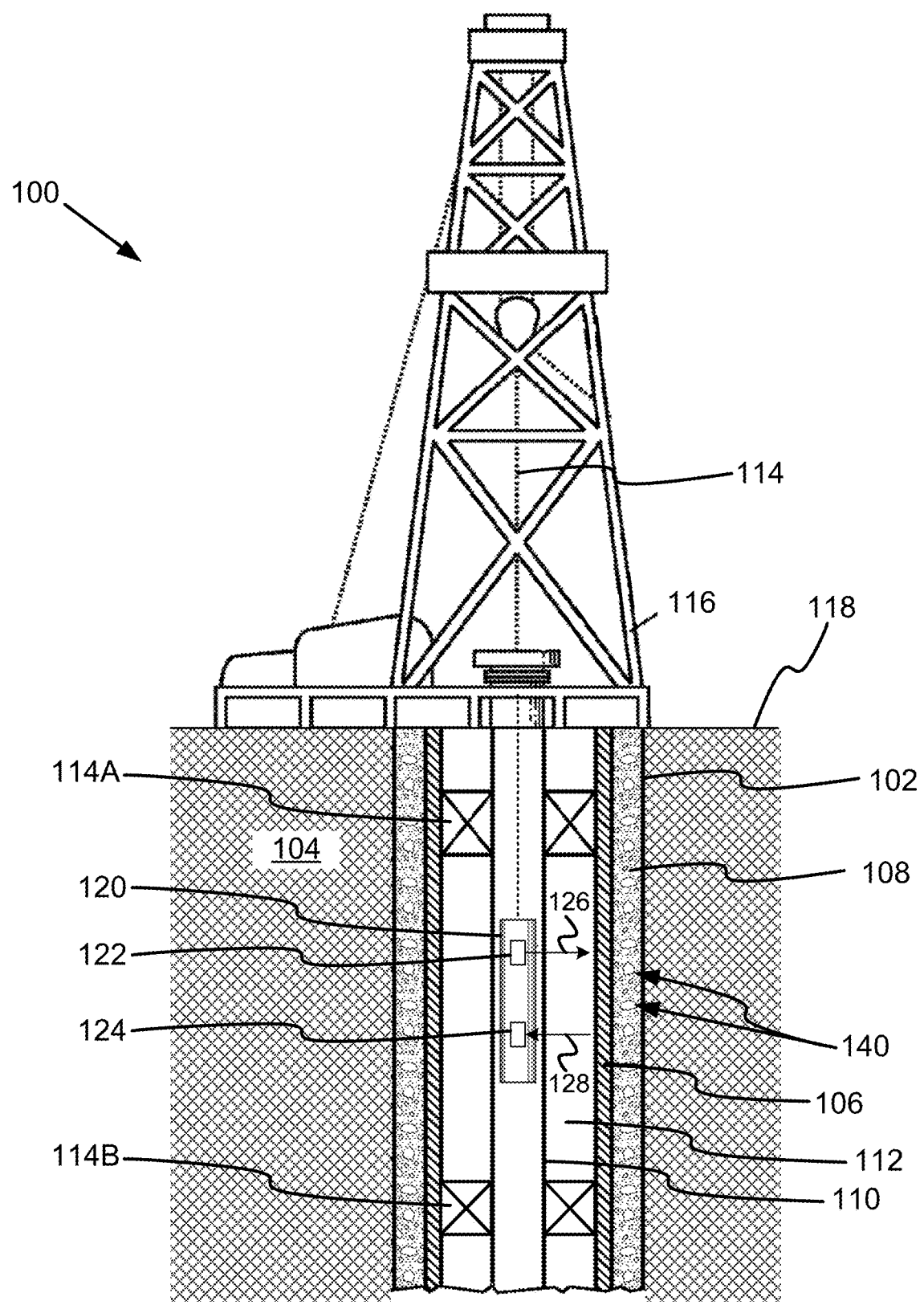
FIG. 1 depicts an example completed wellbore, according to some embodiments.

The description that follows includes example systems, methods, techniques, and program flows that embody aspects of the disclosure. However, it is understood that this disclosure may be practiced without these specific details. For instance, this disclosure refers to completed wellbores with production tubing in illustrative examples. Aspects of this disclosure can be also applied to wellbores having a plurality of tubulars within a casing of the wellbore. In other instances, well-known instruction instances, protocols, structures, and techniques have not been shown in detail in order not to obfuscate the description. Also, while examples described herein refer to cement, the material positioned in the annulus that is being evaluated can be any type of sealing material.

In some cases, a decision to plug and abandon a wellbore can be based, at least in part, on the integrity and quality of a sealing material (e.g. cement) surrounding a casing of a wellbore. Wellbore cement evaluation often includes identification of channeling within the sealing material, wherein the sealing material is not fully distributed around the casing. This can lead to inadequate hydraulic isolation in different radial azimuths. One existing method for evaluation of a sealing material is based on bond indexes. However, conventional methods for determining a bond index are limited to open-hole environments and can require removal of a production tubing in order to evaluate the sealing material. In particular, the casing along with production tubing can composed of multiple metal layers. If a tool used to perform the evaluation is positioned within these multiple metal layers relative to the cement, the presence of these multiple metal layers can substantially increase the complexity of accurately evaluating the cement. Thus, conventional operations for evaluating a sealing material include removal of the production tubing. However, removal of production tubing requires halting production and can be expensive and time consuming.

Example embodiments can perform sealing material evaluation even with these multiple metal layers remaining in position between the evaluation tool and the sealing material being evaluated. For example, example embodiments can perform sealing material evaluation without removal of production tubing. Therefore, in comparison to conventional sealing material evaluation operations, example embodiments can be less expensive and time consuming while still providing an accurate evaluation.

In some embodiments, evaluation of the sealing material can be performed using acoustic measurement tools. In particular, the presence of channels in a sealing material bonding a casing to a wellbore can be determined based on evaluating a portion of a returned waveform that is associated with the sealing material. The portion of the returned waveform that is associated with a region of interest containing the sealing material can be determined based on a time window, which can be dependent on the geometry of the tubulars in the wellbore. Additionally, the returned waveform can be trimmed based on the time window. In some embodiments, the returned waveform can also be time-scaled.

In some embodiments, determining the time window to trim the return waveform can be based on wall thicknesses of tubulars of the wellbore and distances between interfaces of differing material compositions. In addition to the relative spacing between the interfaces, determining the time window can be based on a velocity of the waveform through each material. A calibration curve can be generated for a range of composition ratios ranging from 0% sealing material to 100% sealing material based on the time window and the geometry of the wellbore.

In some embodiments, a quality index can be calculated and used as a reference parameter for hydraulic bond evaluation of a sealing material. The quality index can be based on a density of information in the time-trimmed return waveform, in particular, a spectral density. In some embodiments, quality index values are correlated with a range of composition ratios representing an amount of perceived sealing material present in the region of interest. Also, a composition ratio for a region of interest can be determined based on the correlation and quality index for the region of interest. In some embodiments, the composition ratio can be represented by a percentage of sealing material in the region of interest. In various embodiments, the percentage of sealing material and/or the composition ratio being below a threshold can be an indication that a channel in the sealing material exists.

In some embodiments, acoustic measurements can be made for multiple azimuthal directions using a through tubing evaluation (TTE) tool having an acoustic emitter and detector. In other embodiments, measurements can be in a specified direction. Optionally, at least a portion of the tool can be rotated to evaluate sealing material at another azimuth. Alternatively, the emitter and detector may be omni-directional where rotation of the tool is not required to obtain measurements across an azimuthal range to create a 360 degree wellbore log. In some embodiments, a distance between an emitter and a detector can be determined based on the calibration curve and/or the correlation between quality indices and composition ratios.

Example System

FIG. 1 depicts an example completed wellbore, according to some embodiments. In FIG. 1, a well system 100 includes an example through-tubing cement evaluation (TTCE) tool 120 suspended within a wellbore 102 in a subterranean formation 104. The wellbore 102 can be a completed wellbore having a casing 106 secured in the wellbore 102 by a sealing material (e.g., cement) 108 that substantially fills an annulus between the casing 106 and the wellbore 102. As depicted, a production tubing 110 is positioned within the casing 106 and secured by packers 114A, 114B positioned in an annulus 112 between the production tubing 110 and the casing 106.

The tool 120 can be positioned at a depth in the wellbore 102 to evaluate a composition of a region of interest containing the sealing material 108 at that depth. In some embodiments, the tool 120 can be lowered into the production tubing 110 via a cable 114 from a wellhead 116 at a surface 118 of the wellbore 102. Alternatively, the cable 114 may be a wireline, a slickline, a coiled tubing, etc.

The tool 120 can include an emitter 122 and a detector 124. While the emitter 122 and the detector 124 are depicted in the same tool, in some other embodiments, the emitter 122 and the detector 124 are not integrated into the same tool. For example, the emitter 122 and the detector 124 can be integrated into separate tools and/or part of the production tubing 110. In use, the emitter 122 may transmit an acoustic pulse 126 in a first azimuthal direction. The acoustic pulse 126 may have a defined frequency that is selected based on a geometry of the wellbore 102 and/or a geometry of one or more of the production tubing 110, the casing 106, and the sealing material 108. For example, the acoustic pulse 126 may have a frequency of 10 kHz. In some embodiments, the frequency of the acoustic pulse 126 can be selected to increase a sensitivity of a quality index, as further described below in reference to FIG. 2. However, the acoustic pulse 126 is not limited with respect to frequency.

The acoustic pulse 126 may contact, be reflected by, and/or cause reverberations in the production tubing 110, the casing 106, the sealing material 108, and the formation 104. These reflections and/or reverberations can be a return signal 128 that is detected by the detector 124. The return signal 128 can then be processed to determine whether there are channels and/or voids 140 present in the sealing material 108. In some embodiments, the tool 120 may include a processor (not pictured) that can process the return signal 128 downhole. Alternatively or in addition, processing of the return signal 128 can be performed at the surface 118. In some embodiments, a portion of the processing may be performed downhole and a portion of the processing may be performed at the surface 118.

In some embodiments, one or more portions of the tool 120 may be rotated to transmit and/or receive acoustic pulses in more than one azimuthal direction to create a 3-dimensional model of the wellbore 102. For example, the emitter 122 may be a directionally collimated emitter. Alternatively, the emitter 122 can be a monopole emitter. In some embodiments, the detector 124 may be an omni-directional detector. Alternatively, the detector 124 may be a monopole detector. Optionally, the tool 120 may be raised and lowered within the production tubing 110 to evaluate the sealing material 108 over a range of depths.

Example Casing Configuration

Figure 2:
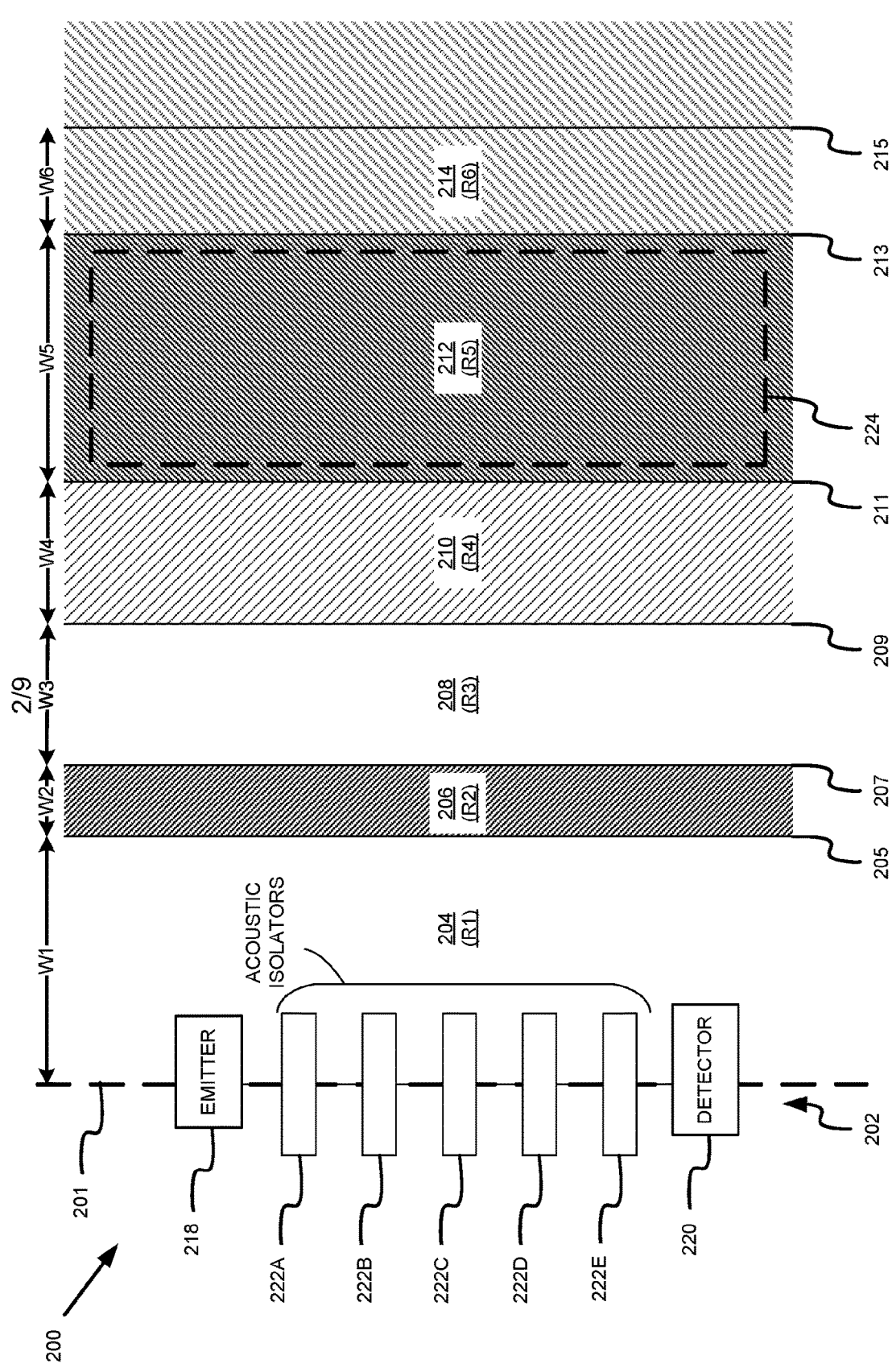
FIG. 2 depicts a cross-sectional longitudinal view of an example downhole tool positioned within a multi-string configuration of tubulars in a wellbore, according to some embodiments.

FIG. 2 depicts a cross-sectional longitudinal view of an example downhole tool positioned within a multi-string configuration of tubulars in a wellbore, according to some embodiments. FIG. 2 depicts an acoustic measurement tool 202 positioned along a longitudinal axis 201 of a wellbore 214. The wellbore 214 can be a completed wellbore having multiple strings of tubing. As depicted, the wellbore 214 includes a multi-string configuration having an inner tubular 206 positioned within a casing 210. The inner tubular 206 defines an inner volume 204 in which the tool 202 can be positioned. An annulus 208 is defined between the inner tubular 206 and a casing 210 of the wellbore 214. A sealing material (e.g., cement) 212 secures the casing 210 in the wellbore 214.

In some embodiments, the inner volume 204 and the annulus 208 can be partially or entirely filled with a liquid composition. Example liquid compositions include brine, drilling fluid, water, etc. For example, the inner volume and the annulus 208 can be filled with water. Alternatively, the inner volume 204 and the annulus 208 may be filled with differing liquid compositions. For example, the inner volume 204 may be filled with water while the annulus 208 is filled with drilling fluid.

In some embodiments, the inner tubular 206 and the casing 210 can be metal. For example, the inner tubular 206 and the casing 210 may both be composed of steel. Optionally, the inner tubular 206 and the casing 210 may be composed of different metals. Alternatively, one or both of the inner tubular 206 and the casing 210 can be a non-metal.

Interfaces 205, 207, 209, 211, 213, and 215 define regions R1, R2, R3, R4, R5, and R6 corresponding to the tubular arrangement. The interface 205 is defined at an inner wall of the inner tubular 206 and defines the region R1 within the inner volume 204 and the inner wall of the inner tubular 206. The interface 207 is defined at an outer wall of the inner tubular 206 and defines the region R2 corresponding to a wall of the inner tubular 206 between the interface 205 and the interface 207. The interface 209 is defined at an inner wall of the casing 210 and defines the region R3 within the annulus 208. The interface 211 is defined at an outer wall of the casing 210 and defines the region R4 corresponding to a wall of the casing 210 between the interface 209 and the interface 211. The interface 213 is defined at an outer edge of the sealing material 212 and/or an inner wall of the wellbore 214, and defines the region R5 corresponding to a wall of the sealing material 212 between the interface 211 and the interface 213. The interface 215 is a virtual interface and represents a plane in a formation surrounding the wellbore 214 beyond which there is no metrology interest. The interface 215 defines the region R6 corresponding to a portion of the formation surrounding the wellbore 214 between the interface 213 and the interface 215. The interface 215 is used to constrain power calculations from measured acoustic waveforms, as further described below.

Each region R1, R2, R3, R4, R5, and R6 has an associated width represented by W1, W2, W3, W4, W5, and W6, respectively. The width of each region can be determined based on geometry of the tubulars and the wellbore. The geometry of the inner tubular 206, the casing 210, and the wellbore 214 can be described using a weight and at least one diameter.

Figure 3:
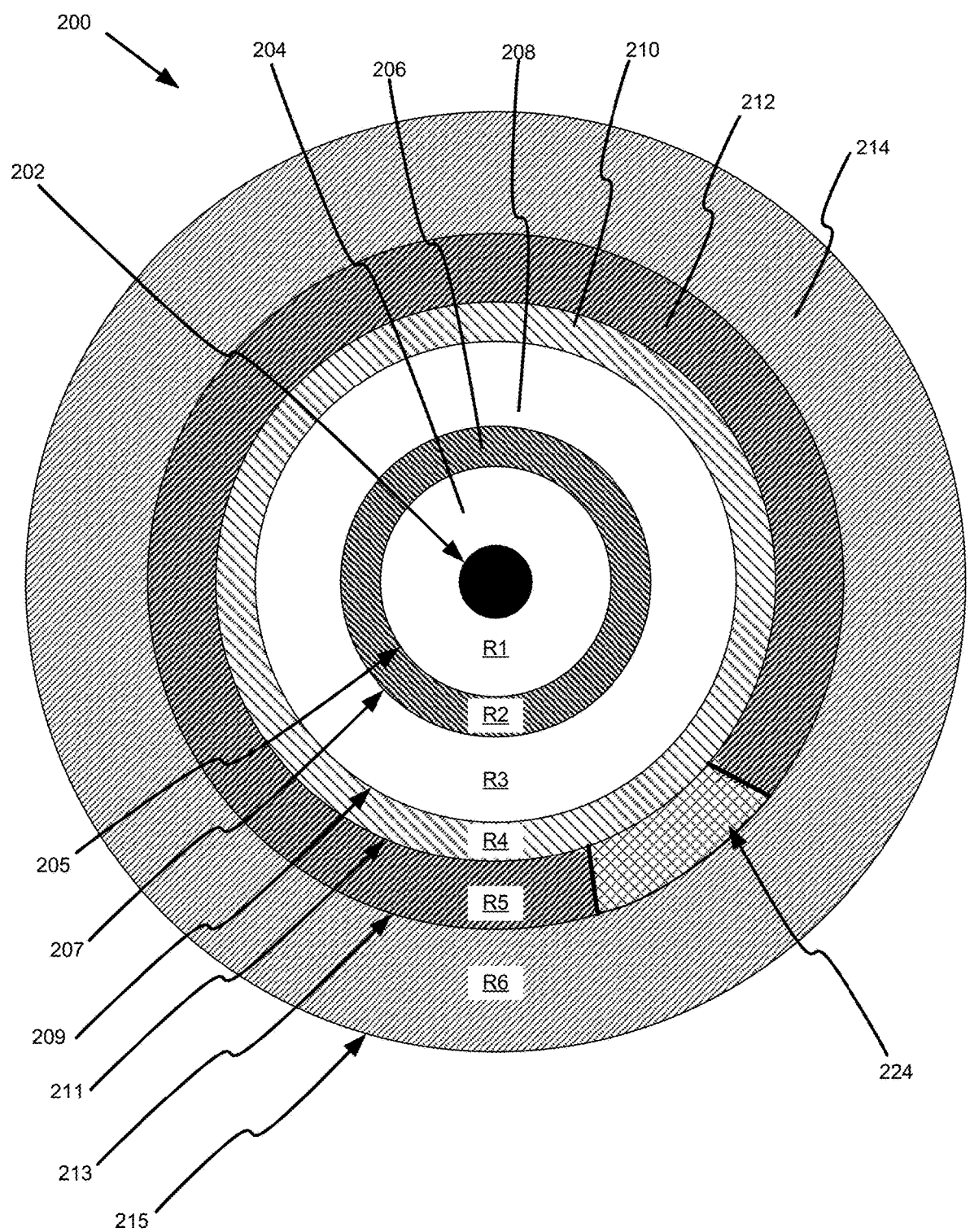
FIG. 3 depicts a cross-sectional transverse view of the example downhole tool positioned within the multi-string configuration of tubulars in the wellbore of FIG. 2.
Figure 4:
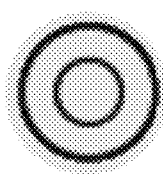
FIG. 4 depicts a table of example arrangements of tubulars within wellbores and their respective geometries.
Figure 4:
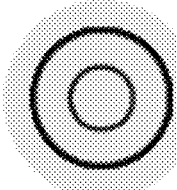
Figure 4:
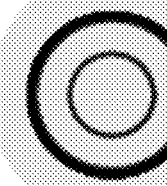

FIG. 3 depicts a cross-sectional transverse view of the example downhole tool positioned within the multi-string configuration of tubulars in the wellbore of FIG. 2. The inner and outer diameters of the inner tubular 206, the casing 210, and the wellbore 214 may vary. To illustrate, FIG. 4 depicts a table of example arrangements of tubulars within wellbores and their respective geometries. A table 400 includes three rows 402-406 and six columns 408-416. The "SCHEME" column 408 includes example arrangements (TT1, TT2, and TT3 in rows 402, 404, and 406, respectively) of an inner tubing (e.g. a production tubing) within a casing that is sealed in a wellbore. The "WELLBORE" column 410 includes an inner diameter of the wellbore for each of the example arrangements. The "PROPERTIES" column 412 includes physical properties of the inner tubing and casing for each of the example arrangements. The properties include a weight of the tubular in pound per feet [ppf], an outer diameter (OD) of the tubular in inches [in], and an inner diameter (ID) of the tubular in inches [in]. The "INNER TUBING" column 414 and the "CASING" column 416 include values corresponding to each of the properties of the column 412 for the inner tubing and the casing for each of the example arrangements. For example, the value corresponding to the property "weight" for the inner tubing of the TT1 arrangement can be in the row 402 and the column 414 (9.3 ppf), and the value corresponding to the property "weight" for the casing of the TT1 arrangement can be in the row 402 and the column 416 (26.0 ppf).

Returning to FIG. 2, the acoustic measurement tool 202 includes an emitter 218 and a detector 220. In operation, the emitter 218 can emit an acoustic signal to evaluate a region of interest 224 containing a portion of the sealing material 212. At a time T=0, the emitter 218 emits the acoustic signal. As a wavefront of the acoustic signal emitted by the emitter 218 traverses each region R1-R6, at least a portion of the signal may be reflected at the respective interface between the regions and be detected by the detector 220 while another portion of the signal my propagate through an adjacent region before it is reflected by a subsequent interface and detected by the detector 220 to generate a measured acoustic waveform.

Interactions between materials within each region and waveforms formed subsequent to the primary waveform emitted from the emitter 218 can continue to generate reflected waveforms that are not associated with the region of interest 224 until a wavefront of the waveform reaches the interface 211. Up to this point in time, the reflected and detected waveforms are associated with an out-of-interest region (any region outside of the region of interest 224) and are not related to an interaction between an acoustic waveform and the sealing material 212 in the region of interest 224. The measured acoustic waveform can be trimmed to identify a portion of the measured acoustic waveform corresponding to the region of interest 224 based on one or more time windows that are determined by the geometry of the multi-string configuration. The time windows can be defined by an offset time, a maximum time, and an out-of-interest time.

The offset time can be defined as a minimum time required for a wavefront parting from the emitter 218 to travel to the interface 211 between the casing 210 and the sealing material 212, where it is reflected, and return to the detector 220. The offset time can be calculated by summing times for the waveform to travel through each region, where the time for the waveform to travel through a region is based on a sound velocity of the waveform traveling through a material composing the region, as further described below with reference to FIG. 8.

The maximum time can be defined as the maximum time required for a wavefront parting from the emitter 218 to travel to the interface 215 assuming a worst-case condition. The maximum time can be dependent on a composition ratio of the region of interest 224 in the region R5. The composition ratio of the region of interest 224 can range from 0% sealing material to 100% sealing material. To determine the maximum time, the worst-case condition can be the absence of sealing material (approximately 0% sealing material). In the worst-case condition, the region of interest 224 can be assumed to be filled with air, water, or another reference fluid.

The measured acoustic waveform can be trimmed based on the maximum time to isolate a region of the measured waveform that is associated with the regions R1-R6. For example, a measured waveform having a total signal time interval of 0 seconds to 5 seconds can be trimmed to generate a time-trimmed measured waveform having a signal time interval of 0 seconds to $T_{wave,max}$, where $T_{wave,max}$ is less than the total signal time interval of 5 seconds. $T_{wave,max}$ can be used to constrain power calculations for the portion of the measured waveform corresponding to the region of interest 224, as further described below with reference to FIGS. 7-8.

The out-of-interest time can be defined as the time at which the wavefront travels beyond the interface 213. Portions of the measured waveform associated with the region R6 (and beyond) are not of interest in determining the composition ratio of the region of interest 224.

From the offset time, the maximum time, and the out-of-interest time, four time windows can be defined. Table 1 includes four time intervals that are defined and correspond to one or more of the regions R1-R6:

TABLE 1

| Time Interval | Region |
|---|---|
| $0 < t < T_{offset}$ | R1-R4 |
| $0 < t < T_{wave,\ max}$ | R1-R6 |
| $T_{offset} < t < T_{out}$ | R5 |
| $T_{offset} < t < T_{wave,\ max}$ | R5-R6 | where t is the time since the waveform is transmitted from the emitter 218, $T_{offset}$ is the offset time, $T_{out}$ is the out-of-interest time, $T_{wave,max}$ is the maximum time, and $T_{total}$ is the total measured signal duration.

In some embodiments, the determined time windows for the model waveforms can be narrow. Where the geometry of a wellbore yields narrow time windows, the model waveforms may be time scaled to determine time windows related to spectral power density information from higher order harmonics. A model waveform can be time scaled by maximizing the time scale based on $T_{wave,max}$ and scaling $T_{offset}$ and $T_{out}$ relative to $T_{wave,max}$ Based on the scaled time, the measured waveform can be evaluated to determine the cement composition ratio in the region of interest 224. Table 2 illustrates an example time scaling for a wellbore configuration:

TABLE 2

| Time Interval | Frontwave [µs] | Scale [%] | Scaled Time [ms] |
| --- | --- | --- | --- |
| $T_{wave,\,max}$ | 451.99 | 100 | 10.0000 |
| $T_{offset}$ | 339.90 | 76.9 | 7.6903 |
| $T_{out}$ | 145.51 | 32.9 | 3.2923 |

In some embodiments, a calibration curve can be generated based on spectral power densities of the model waveforms in a corresponding time window ($T_{offset} < t < T_{wave,max}$) of the model waveform. Within the time window, a greater spectral power density at an earlier time relative to the spectral power density over later times in offset time window (i.e., the spectral power density is skewed left) can indicate a higher percentage of sealing material in the region of interest 224, as the presence of sealing material will reflect a waveform at an earlier time compared to a time for the waveform to reach the wellbore wall (the interface 213), where it is reflected, in the absence of sealing material. For example, a spectral power density in the time window of the model waveform generated for a composition ratio of 100% sealing material can be a maximum spectral power density and a spectral power density in the time window of the model waveform generated for a composition ratio of 0% sealing material can be a minimum spectral power density. Thus, an amount of sealing material present (represented by the composition ratio and/or a percentage of the sealing material in the region of interest 224) can be proportional to the spectral power density in the time window of the model waveform.

In some embodiments, sealing material in the region of interest 224 can be evaluated based on a first quality index. In some embodiments, the first quality index can be determined based on a spectral power density of the time window for the region of interest 224 and a spectral power density of a time window of a model waveform, where the model waveform can be generated for a composition ratio of 100% sealing material.

In some embodiments, a second quality index can be determined based solely on the measured waveform. For example, evaluating the sealing material 212 include can include determining a ratio of a spectral power density for the time window of a measured waveform corresponding to the region of interest 224 to a spectral power density for an offset time window including both the time window for the region of interest and a time window for an out-of-interest region of the measured waveform. However, the first quality index and the second quality index may differ in sensitivity based on a composition of the tubulars and/or liquids of a wellbore configuration.

In some embodiments, quality index values across a range of composition ratios can be plotted as a function of the composition ratio (represented by a percentage of the sealing material in the region of interest 224) to generate a curve. The sensitivity of a quality index can be determined based on a slope of the curve. For example, the first quality index as a function of a percentage of sealing material can be represented by a curve having a first slope and the second quality index as a function of sealing material composition ratio can be represented by a curve having a second slope. If the first slope of the first quality index curve is greater than the second slope of the second quality index curve at a sealing material composition ratio, the first quality index can be determined to be more sensitive for that cement percentage for the given wellbore geometry. In some embodiments, a frequency of the acoustic signal emitted from the emitter 218 can be adjusted to increase the sensitivity of the first and/or second quality index.

Figure 5:
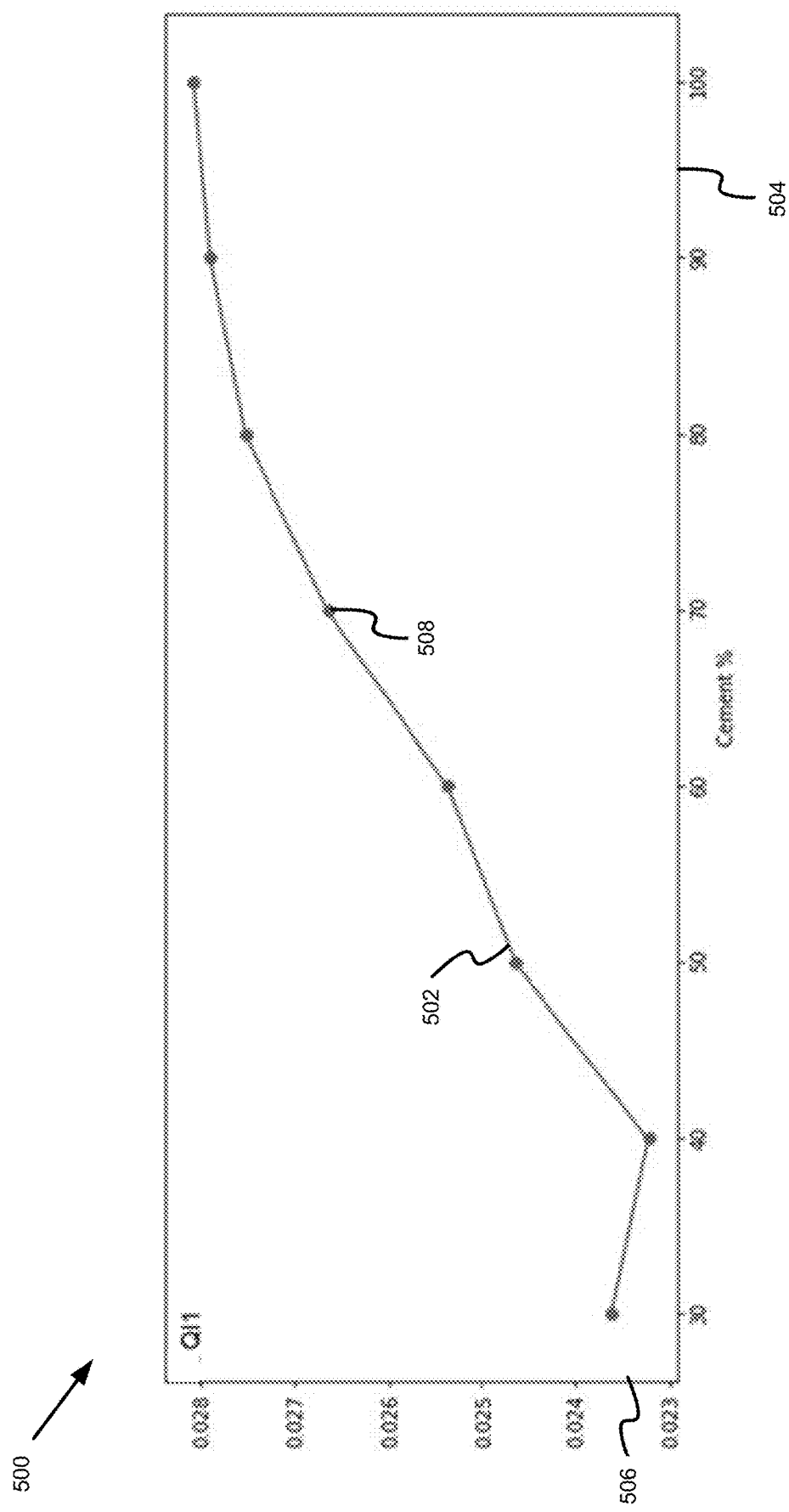
FIG. 5 depicts an example graph of a first quality index as a function of a composition ratio of a region of interest, according to some embodiments.
Figure 6:
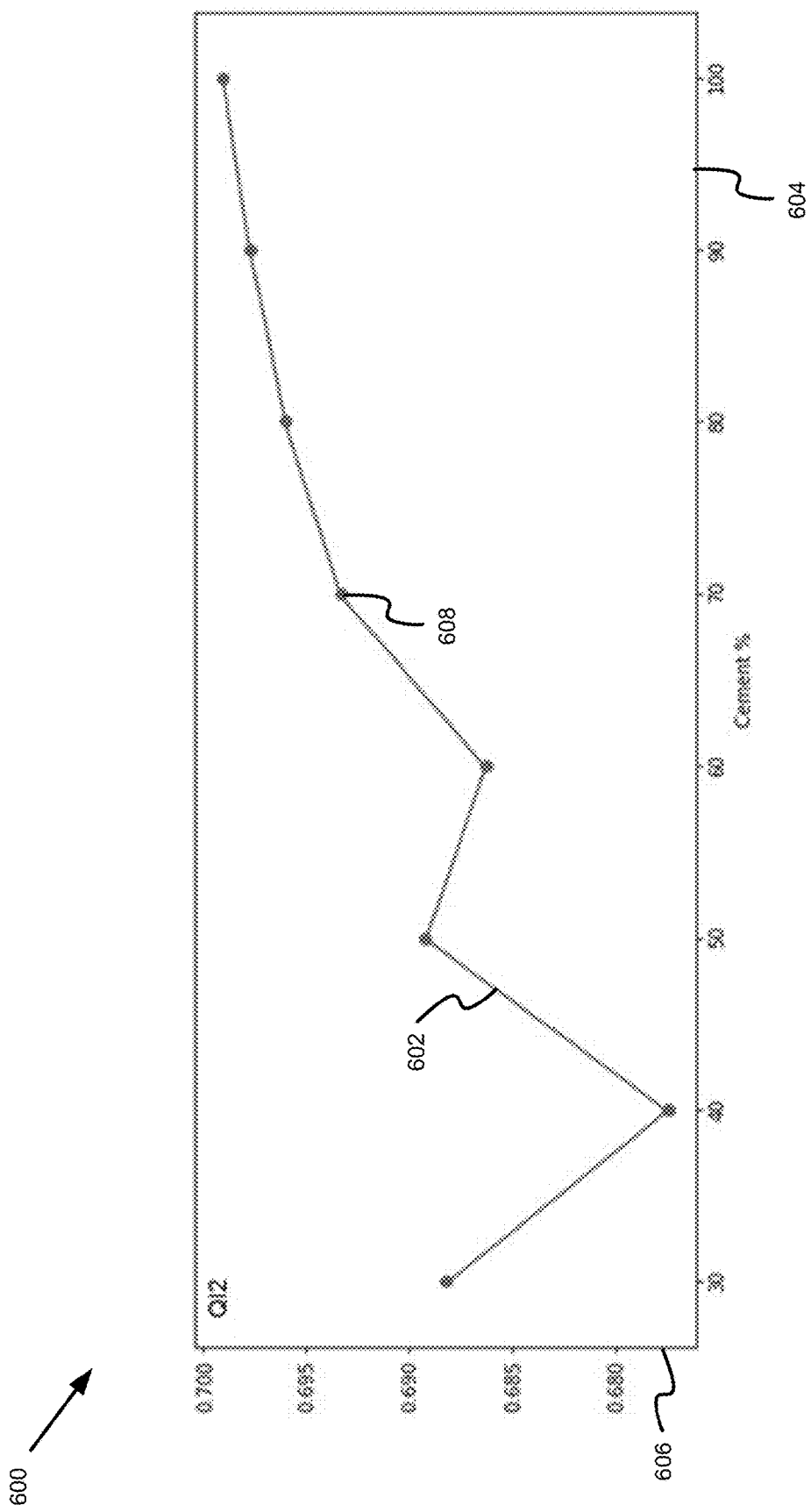
FIG. 6 depicts an example graph of a second quality index as a function of a composition ratio of a region of interest, according to some embodiments.

To illustrate, FIGS. 5-6 respectively depict example graphs of the first and second quality index as a function of a composition ratio of a region of interest. To generate the graphs of FIGS. 5-6, acoustic signals were simulated for the wellbore configuration 200 with a composition ratio ranging from 30% cement to 100% cement in the region R5 to generate model waveforms. The model waveforms were then inverted, and the first and second cement quality indexes were determined for the range of composition ratios.

FIG. 5 depicts an example graph of a first quality index as a function of a composition ratio of a region of interest, according to some embodiments. FIG. 5 shows a graph 500 having an x-axis 504 (cement composition %) and a y-axis 506. As shown, the graph 500 includes an example response curve 502 for quality index values determined for a sealing material (e.g. cement) based on model waveforms with composition ratios ranging from 30% cement to 100% cement.

FIG. 6 depicts an example graph of a second quality index as a function of a composition ratio of a region of interest, according to some embodiments. FIG. 6 shows a graph 600 having an x-axis 604 (cement composition %) and a y-axis 606 (CQI2). As shown, the graph 600 includes an example response curve 602 for an example simulation with composition ratios ranging from 30% cement to 100% cement.

As depicted in FIG. 5, the first quality index displays a monotonic response for composition ratios having greater than 40% cement. As depicted in FIG. 6, the second quality index displays a monotonic response for composition ratios having greater than 60% cement. Thus, the first quality index can be determined to be more sensitive to lower density material relative to the second quality index. However, the second quality index can be determined independent of a reference material.

Returning to FIG. 2, in some embodiments, a distance between the emitter 218 and the detector 220 along the tool 202 can be determined based on a sensitivity of a quality index for a wellbore configuration. For example, a distance between the emitter 218 and the detector 220 can be selected in order to increase sensitivity of measurements. The distance may be determined based on the first quality index, the second quality index, or the first and second quality index. For example, the distance between the emitter 218 and the detector 220 can be selected to increase sensitivity of one or both of the first and second quality index and, in some embodiments, can be based on previous wellbore data, wellbore models, model waveforms, and properties of the sealing material 212. Additionally, the distance between the emitter 218 and the detector 220 may be based, in part, on size constraints. For example, a minimum distance between the emitter 218 and the detector 220 may be determined based on sizes of electronic boards within the tool 202, cabling, and/or other electronic components to minimize noise. Further, FIG. 2 depicts the acoustic measurement tool having five acoustic isolators 222A, 222B, 222C, 222D, and 222E. However, in some embodiments the acoustic tool 202 can include a lesser or greater number. The acoustic isolators 222A-222E can be used to dump direct acoustic power from the emitter 218 without transmitting the acoustic power through the multi-string tubular configuration. Alternatively, the acoustic tool 202 may include zero acoustic isolators.

Example Operations

Figure 7:
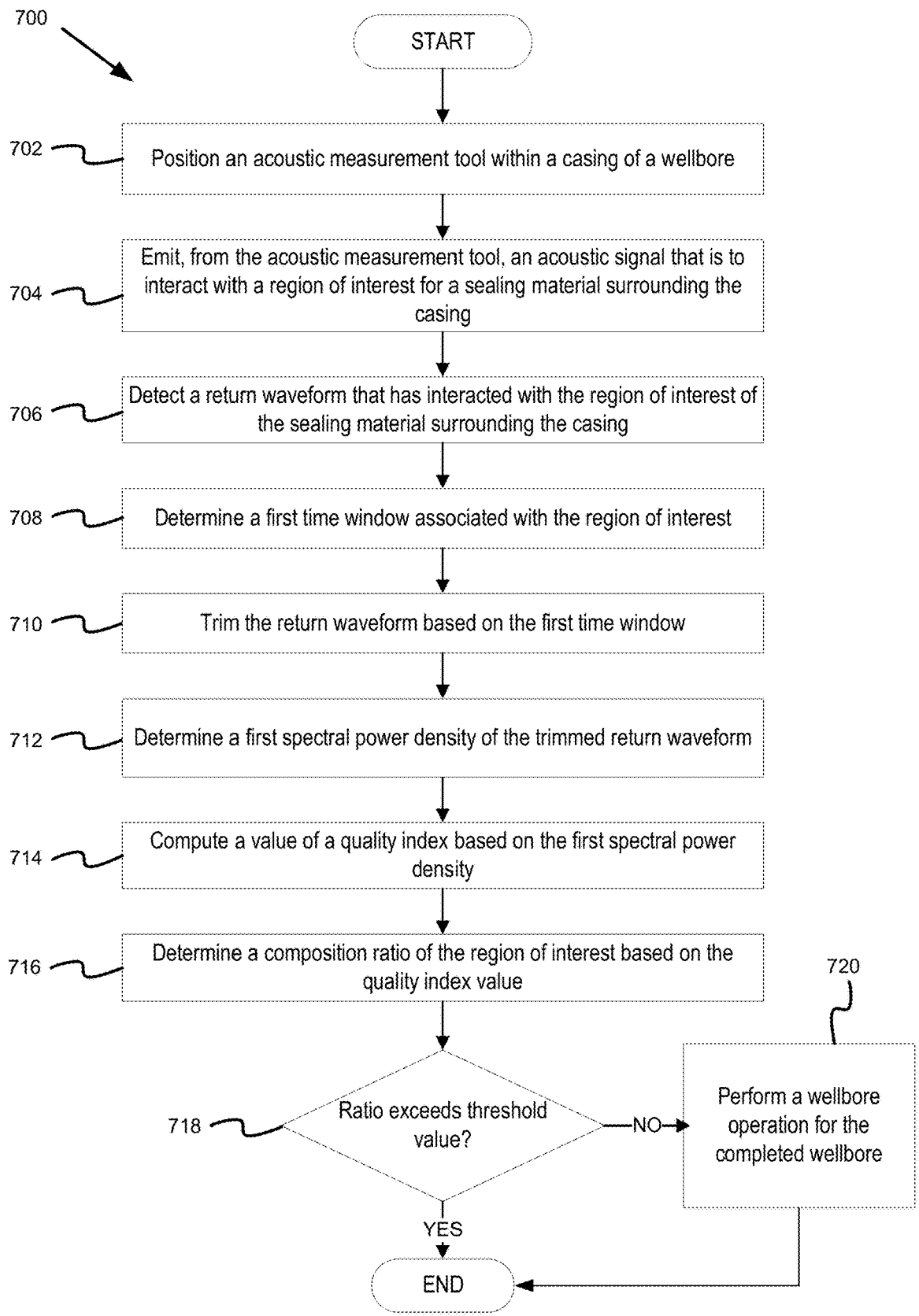
FIG. 7 depicts a flowchart of example operations for determining a composition ratio of a region of interest based on acoustic measurements, according to some embodiments.

To further illustrate, operations for through-tubing evaluation of a sealing material are now described with reference to FIGS. 7-8. FIG. 7 depicts example operations for determining a composition ratio of a region of interest based on acoustic measurements, according to some embodiments. Operations of flowcharts 700-800 can be performed by software, firmware, hardware, or a combination thereof. Operations of the flowcharts 700-800 are described in reference to the example well system 100 of FIG. 1. However, other systems and components can be used to perform the operations now described. The operations of the flowchart 700 start at block 702.

At block 702, an acoustic measurement tool is positioned within a casing of a wellbore. For example, with reference to FIG. 1, the acoustic measurement tool 120 can be positioned within the casing 106. In some implementations, the acoustic measurement tool 120 can also be positioned within the production tubing 110 that is within the casing 106.

At block 704, an acoustic signal that is to interact with a region of interest of a sealing material surrounding the casing is emitted from the acoustic measurement tool. For example, with reference to FIG. 1, the acoustic measurement tool 120 can emit the acoustic pulse 126 from the emitter 122, where the acoustic pulse 126 is to interact with the sealing material 108.

At block 706, a return waveform that has interacted with the region of interest containing the sealing material surrounding the casing is detected. For example, with reference to FIG. 1, the detector 124 can detect the return waveform 128, where the return waveform 128 is generated by the acoustic pulse 126 interacting with a region of interest within the sealing material 108.

At block 708, a first time window associated with the region of interest of the sealing material is determined. For example, with reference to FIG. 1, a processor in the tool 120 and/or a processor at the surface 118 of the wellbore 102 can make this determination. Example operations for determining the first time window are further described below with reference to FIG. 8.

At block 710, the return waveform is trimmed based on the first time window. For example, with reference to FIG. 1, a processor in the tool 120 and/or a processor at the surface 118 of the wellbore 102 can trim the return waveform. For example, the return waveform can be trimmed such that only spectral information from the time interval $T_{offset} < t < T_{wave,max}$ is retained. In some embodiments, the trimmed return waveform can then be time scaled. For example, the time scale of the waveform can be maximized by setting $T_{wave,max}$ equal to a longer time, and $T_{offset}$ and $T_{out}$ can be scaled relative to $T_{wave,max}$, as shown in Table 2.

At block 712, a first spectral power density of the trimmed return waveform is determined. For example, with reference to FIG. 1, a processor in the tool 120 and/or a processor at the surface 118 of the wellbore 102 can make this determination. In some embodiments, the first spectral power density of the trimmed return waveform may be a spectral power density of the trimmed return waveform within a particular time interval. For example, the first spectral power density can be the spectral power density within the time interval $T_{offset} < t < T_{out}$. In some embodiments, multiple spectral power densities may be determined based on the trimmed return waveform. For example, a second spectral power density of the trimmed return waveform can be the spectral power density within the time interval $T_{offset} < t < T_{wave,max}$.

In some embodiments, the quantity of spectral power densities and their corresponding time intervals can be selected based on a desired quality index that will be used to evaluate the sealing material. For example, if the first quality index as described in reference to FIG. 2 is to be used, a first spectral power density of the trimmed return waveform can be determined for the time interval $T_{offset} < t < T_{out}$. In some embodiments, a second spectral power density of a model waveform can be determined for the same time interval, where the model waveform is generated based on the geometry of the wellbore in which the return waveform is measured.

As a second example, if the second quality index as described in reference to FIG. 2 is to be used, a first spectral power density of the trimmed return waveform can be determined for the time interval $T_{offset} < t < T_{out}$ and a second spectral power density of the trimmed return waveform can be determined for the time interval $T_{offset} < t < T_{wave,max}$.

At block 714, a value for a quality index is computed based on the first spectral power density. In some embodiments, the quality index is based on the first spectral power density of the trimmed return waveform and a second spectral power density of a model waveform. For example, a first cement quality index (CQI1) can be defined by a ratio of the first spectral density power of the trimmed return waveform in the first time interval to the second spectral density power of the model waveform in the same time interval, where the model waveform can be generated based on a region of interest having a composition of 100% sealing material (e.g. 100% cement). CQI1 is given by Equation 1:

$$CQI1 = \frac{\int_{T_{offset}}^{T_{out}} \left( abs(p(t)) - \frac{\int_{T_{out}}^{T_{wave,max}} abs(p(t))}{T_{wave,max} - T_{out}} \right)}{\int_{T_{offset}}^{T_{out}} \left( abs(g(t)) - \frac{\int_{T_{out}}^{T_{wave,max}} abs(g(t))}{T_{wave,max} - T_{out}} \right)} \quad (1)$$

where CQI1 is the first cement quality index, $T_{offset}$ is the offset time, $T_{out}$ is the out-of-interest time, and $T_{wave,max}$ is the maximum time, abs(p(t)) is an absolute value of an amplitude pressure of the measured waveform as a function of time, and abs(g(t)) is an absolute value of an amplitude pressure of the model waveform for the wellbore as a function of time.

In some embodiments, the quality index can be based on the first spectral power density of the trimmed return waveform in the time interval $T_{offset} < t < T_{out}$ and a second spectral power density of the trimmed return waveform in the time interval $T_{offset} < t < T_{wave,max}$. For example, a second cement quality index (CQI2) can be defined by a ratio of the spectral power density for the time window of the region of interest ($T_{offset} < t < T_{out}$) to the spectral power density for the offset time window ($T_{offset} < t < T_{wave,max}$) CQI2 is given by Equation 2:

$$CQI2 = \frac{\int_{T_{offset}}^{T_{out}} abs(p(t))}{\int_{T_{offset}}^{T_{wave,max}} abs(p(t))} \quad (2)$$

where CQI2 is the second cement quality index, $T_{offset}$ is the offset time, $T_{out}$ is the out-of-interest time, $T_{wave,max}$ is the maximum time, and abs(p(t)) is an absolute value of an amplitude pressure of the trimmed return waveform as a function of time.

In some embodiments, the quality index can be selected based on a sensitivity of the quality index for the configuration of tubulars within the wellbore in which the return waveform was measured. For example, with reference to FIGS. 5-6, CQI1 can be selected because it is more sensitive to lower density materials than CQI2 for the given arrangement of tubulars within the wellbore. Alternatively or in addition, CQI2 can be selected.

At block 716, a composition ratio of the region of interest is determined based on the quality index value. For example, with reference to FIG. 1, a processor in the tool 120 and/or a processor at the surface 118 of the wellbore 102 can make this determination. In some embodiments, values for a quality index can be correlated to composition ratio values across a range of composition ratios. For example, with reference to FIG. 5, values of the first cement quality index (CQI1) are correlated to values of a composition ratio for a region of interest across a range of 30% cement to 100% cement within the region of interest. If CQI1 is determined to be 0.25, it can be determined that the composition ratio is approximately 60% cement. As a second example, with reference to FIG. 6, values of the second cement quality index (CQI2) are correlated to values of a composition ratio for a region of interest across the range of 30% cement to 100% cement within the region of interest. If CQI2 is determined to be 0.695, it can be determined that the composition ratio for the region of interest is approximately 75% cement.

In some embodiments, if the quality index is determined to be a value in a range in which the quality index is less sensitive (i.e., does not display a monotonic response curve), an alternative quality index may be used. For example, if CQI2 is determined to be 0.685, the graph 600 of FIG. 6 indicates that the composition ratio for the region of interest may be approximately 35% cement or approximately 45% cement. In such a case, it is possible that CQI1 will be more sensitive. For example, if the composition ratio is 45% cement and CQI1 displays a monotonic response for composition ratios in a range including 45% cement, as indicated by the monotonic response of CQI1 for composition ratios greater than 40% cement in FIG. 5, CQI1 may be used.

At block 718, a determination whether the composition ratio exceeds a desired threshold value. For example, with reference to FIG. 1, a processor in the tool 120 and/or a processor at the surface 118 of the wellbore 102 can make this determination. The threshold value can be a lower threshold value for the composition ratio. A composition ratio for a region of interest less than 100% cement can indicate the presence of channels or voids within the sealing material, insufficient hydraulic isolation, etc. However, the threshold value can be any composition ratio value below which requires a wellbore operation be taken. For example, with reference to FIG. 1, a low composition ratio for a region of interest can indicate the presence of voids 140 in the sealing material 108 in the region of interest. For example, a composition ratio of less than 40% sealing material for the region of interest can indicate insufficient hydraulic isolation. In some embodiments, the threshold value can be based on wellbore models, wellbore data from previous wellbores, and/or test data. If the composition ratio is determined to be below the threshold value, operations of the flowchart continue at block 720. If the composition ratio is determined to exceed the threshold value, operations of the flowchart 700 are complete.

At block 720, a wellbore operation is performed for the completed wellbore. For example, with reference to FIG. 1, if the composition ratio for the region of interest is determined to indicate a large amount of voids 140 in the sealing material 108, the wellbore 102 may be plugged and/or abandoned. Operations of the flowchart 700 are complete.

Figure 8:
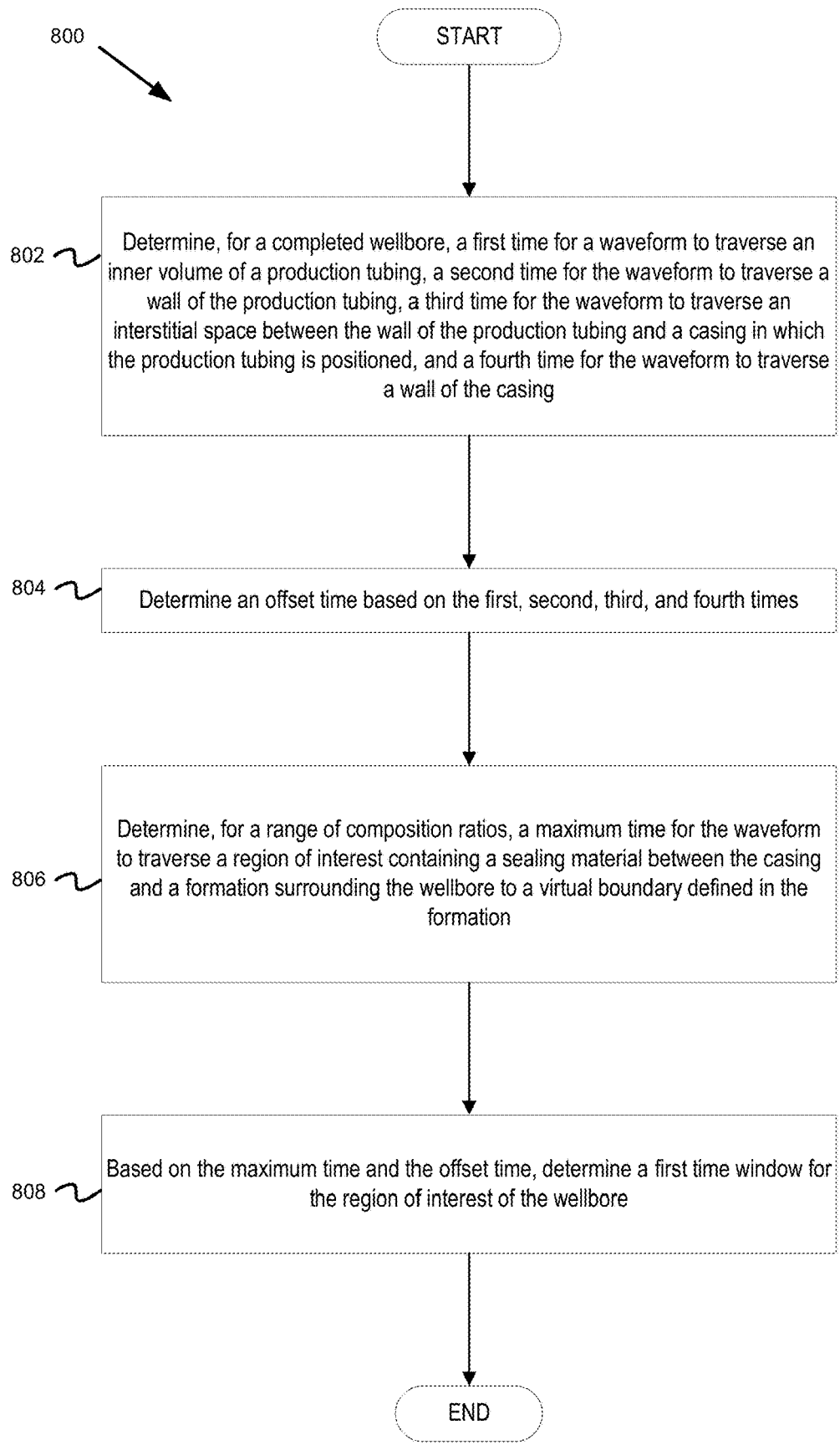
FIG. 8 depicts a flowchart of example operations for determining a time window for trimming an acoustic waveform, according to some embodiments.

FIG. 8 depicts example operations for determining a time window for trimming a measured waveform. FIG. 8 is described with reference to the example tubular configuration of FIGS. 2-3, where geometry of the inner tubular 206, the casing 210, the sealing material 212, and the wellbore 214 are defined by the TT2 geometry as depicted in FIG. 4.

At block 802, a first time for a waveform to traverse an inner volume of a production tubing, a second time for the waveform to traverse a wall of the production tubing, a third time for the waveform to traverse an interstitial space between the wall of the production tubing and a casing in which the production tubing is positioned, and a fourth time for the waveform to traverse a wall of the casing are determined for a completed wellbore. The times for a waveform to traverse a region can be determined based on a width of the region and a sound velocity of a waveform travelling through the region. For example, with reference to FIG. 2, the time for a waveform to travel through the region R3 (the interstitial space between the wall of the inner tubular 206 and the casing 210 in which the inner tubular 206 is positioned) can be dependent on the width W3 of the region R3 and the sound velocity of a waveform traveling through the region R3. With reference to FIG. 2, the first, second, third, and fourth times are given by Equations 3-6, respectively:

$$t_1 = \frac{ID_{tubing}}{2v_1} = \frac{w_1}{v_1} \quad (3)$$

$$t_2 = \frac{OD_{tubing} - ID_{tubing}}{2v_2} = \frac{w_2}{v_2} \quad (4)$$

$$t_3 = \frac{ID_{casing} - OD_{tubing}}{2v_3} = \frac{w_3}{v_3} \quad (5)$$

$$t_4 = \frac{OD_{casing} - ID_{casing}}{2v_4} = \frac{w_4}{v_4} \quad (6)$$

where $t_1$ is the time for the waveform to traverse the region R1, $t_2$ is the time interval for the waveform to traverse the region R2, $t_3$ is the time interval for the waveform to traverse region the region R3, $t_4$ is the time interval for the waveform to traverse region the region R4, $w_1$ is the width of the region R1, $w_2$ is the width of the region R2, $w_3$ is the width of the region R3, $w_4$ is the width of the region R4, $w_5$ is the width of the region R5, $w_6$ is the width of the region R6, $ID_{tubing}$ is the inner diameter of the inner tubular 206, $OD_{tubing}$ is the outer diameter of the inner tubular 206, $ID_{casing}$ is the inner diameter of the casing 210, $OD_{casing}$ is the outer diameter of the casing 210, $v_1$ is the sound velocity for the region R1, $v_2$ is the sound velocity for the region R2, $v_3$ is the sound velocity for the region R3, and $v_4$ is the sound velocity for the region R4.

The sound velocity for a fluid filled region can be defined as a primary wave sound velocity. For example, for a 10 kHz Gaussian input excitation, the sound velocity for the regions R1 and R3, given that R1 and R3 are composed of water, is 1487 m/s. For non-fluid regions, the sound velocity can be defined by primary and secondary wave velocities. For example, for the regions R2 and R4, given that R2 and R4 are composed of steel, the p-wave sound velocity is 5423 m/s and the s-wave sound velocity is 3202 m/s.

In some embodiments, the fluid in the region R1 is the same or substantially the same liquid as the liquid in the region R3, and the material of the region R2 is the same or substantially the same material as the material of the region R4. However, in some embodiments the liquid in the region R1 may differ from the liquid in the region R3. Alternatively or in addition, the material composing R2 may differ from the material composing R4.

At block 804, an offset time is determined based on the first, second, third, and fourth times. For example, with reference to FIG. 1, a processor in the tool 120 and/or a processor at the surface 118 of the wellbore 102 can make this determination. For example, with reference to FIG. 2, the offset time can be determined by summing the times for the wavefront to travel through the regions R1-R4, up to the interface 211. The offset time is given by Equation 7:

$$T_{offset} = \frac{ID_{tubing}}{v_1} + \frac{OD_{tubing} - ID_{tubing}}{v_2} + \frac{ID_{casing} - OD_{tubing}}{v_3} + \frac{OD_{casing} - ID_{casing}}{v_4} = 2(t_1 + t_2 + t_3 + t_4) \quad (7)$$

where $T_{offset}$ is the offset time interval in seconds, $ID_{tubing}$ is the inner diameter of the inner tubular 206, $OD_{tubing}$ is the outer diameter of the inner tubular 206, $ID_{casing}$ is the inner diameter of the casing 210, $OD_{casing}$ is the outer diameter of the casing 210, $v_1$ is the sound velocity for the region R1, $v_2$ is the sound velocity for the region R2, $v_3$ is the sound velocity for the region R3, and $v_4$ is the sound velocity for the region R4.

At block 806, a maximum time for the waveform to traverse a region of interest containing a sealing material between the casing and a formation surrounding the wellbore to a virtual boundary defined in the formation is determined. For example, with reference to FIG. 1, a processor in the tool 120 and/or a processor at the surface 118 of the wellbore 102 can make this determination. For example, with reference to FIG. 2, the maximum time can be the time required for a wavefront to travel from the interface 211 to the virtual interface 215. Return waveforms detected at times greater than the maximum time can be determined to be associated with an out-of-interest region (i.e. beyond the virtual interface 215). The maximum time is given by Equation 8:

$$T_{wave,max} = T_{offset} + \frac{ID_{well} - OD_{casing}}{v_{ref}} + \frac{\overline{OD_{well}} - ID_{well}}{v6} \quad (8)$$

where $T_{wave,max}$ is the maximum time interval, $T_{offset}$ is the offset time interval, $ID_{well}$ is the inner diameter of the wellbore 214, $OD_{casing}$ is the outer diameter of the casing 210, $\overline{OD_{well}}$ is the twice the distance from the axis 201 to the interface 215, $v_{ref}$ is the sound velocity for the region R5 (assuming 0% sealing material), and $v_6$ is the sound velocity for the region R6.

The sound velocity through the region R5 is dependent on the composition ratio of the region of interest. Because that is unknown, model waveforms can be generated by determining the sound velocity through the region of interest, where the region of interest may have a range of composition ratios ranging from 0% sealing material (e.g. air or water) to 100% sealing material. For example, for a 100% cement composition in the region R5, the p-wave sound velocity is 3213 m/s and the s-wave sound velocity is 1878 m/s. For a 0% cement composition in the region R5, assuming the region R5 is filled with water, the p-wave velocity is 1487 m/s and the s-wave velocity is zero. As a second example, for a 0% cement composition in the region R5, assuming the region R5 is filled with air, the p-wave velocity is 343 m/s and the s-wave velocity is zero. The following CQI calculations are performed using air as the 0% cement composition. However, any reference material or liquid having a 0% cement composition may be used. P-wave velocity through the region R5 for a given cement composition percentage is given by Equation 9:

$$v_{p,5} = v_{p,ref} + 0.01(\text{cement\_percent})(v_{p,cement} - v_{p,ref}) \quad (9)$$

where $v_{p,5}$ is the p-wave velocity through the region R5 for a given cement composition percentage in m/s, $v_{p,ref}$ is the p-wave sound velocity through the reference material in m/s, cement_percent is a percentage of cement in the region R5 ranging from 0% to 100%, and $v_{p,cement}$ is the p-wave velocity through cement in m/s. While described in reference to cement, the sealing material may be any material used to secure the casing within the wellbore.

S-wave velocity through the region R5 for a given cement composition percentage is given by Equation 10:

$$v_{s,5} = 0.01(\text{cement\_percent})(v_{s,cement}) \quad (10)$$

where $v_{s,5}$ is the s-wave velocity through the region R5 for a given cement composition percentage in m/s, cement_percent is a percentage of cement in the region R5 ranging from 0% to 100%, and $v_{s,cement}$ is the s-wave sound velocity through cement in m/s.

At block 808, a time window associated with the region of interest of the wellbore is determined based on the maximum time and the offset time. For example, with reference to FIG. 1, a processor in the tool 120 and/or a processor at the surface 118 of the wellbore 102 can make this determination. The time window can be a time interval in which the waveform traverses a region containing the sealing material. For example, with reference to FIG. 2, the time interval can be the time required for the wavefront to traverse the regions R5 and R6, and the time window can be defined as $T_{offset} < t < T_{wave,max}$.

In some embodiments, the time window can be isolated to the region of interest and defined by an out-of-interest time. In such embodiments, the time window can be defined as $T_{offset} < t < T_{out}$. The out-of-interest time is given by Equation 11:

$$T_{out} = T_{wave,max} - \frac{\overline{OD_{well}} - ID_{well}}{v6} \quad (11)$$

where $T_{out}$ is the out-of-interest time interval, $T_{wave,max}$ is the maximum time interval, $ID_{well}$ is the inner diameter of the wellbore 214, $\overline{OD_{well}}$ is the twice the distance from the axis 201 to the interface 215, and $v_6$ is the sound velocity for the region R6.

Operations of the flowchart 800 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 702 and 708 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Computer

Figure 9:
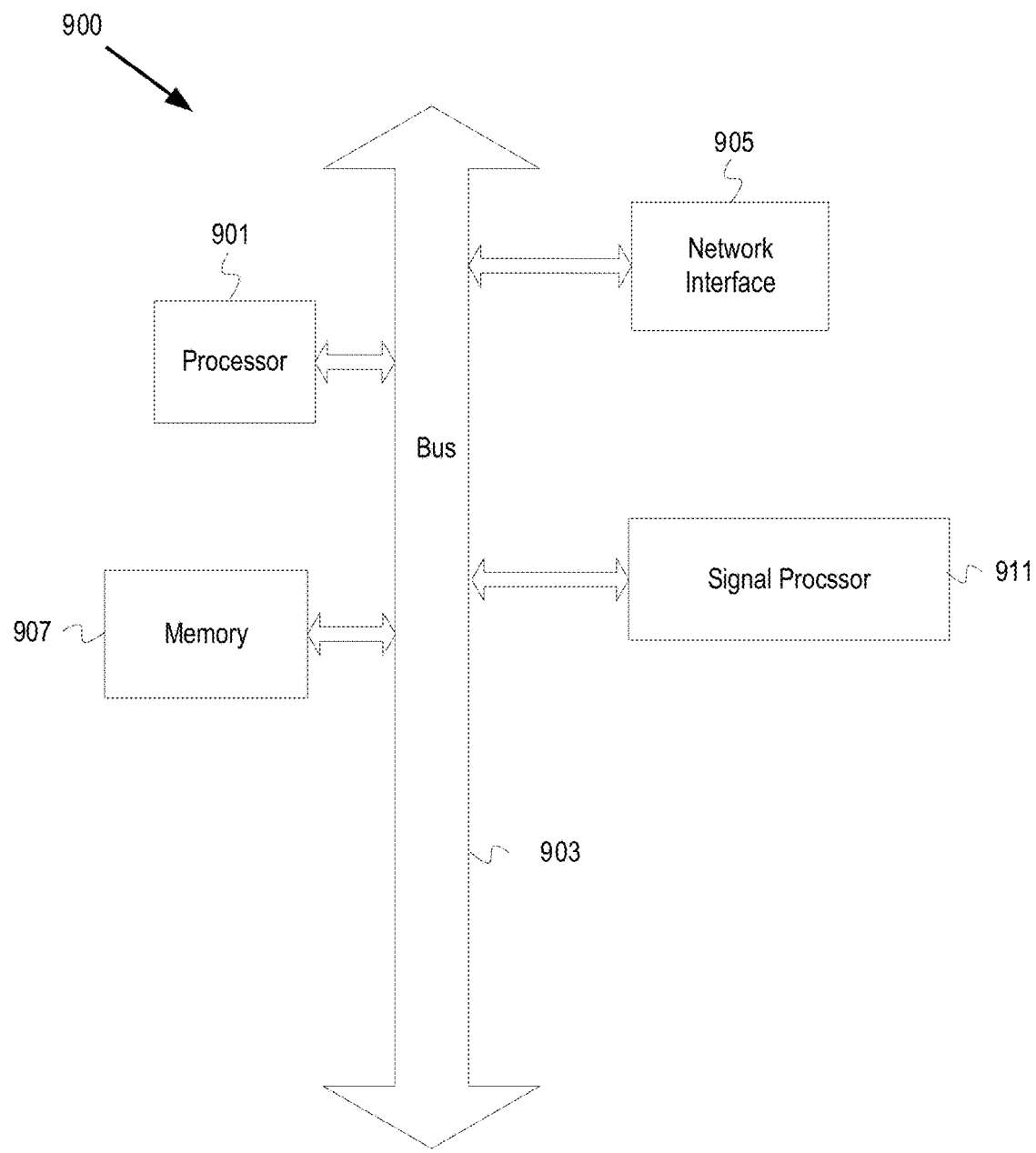
FIG. 9 depicts an example computer, according to some embodiments.

FIG. 9 depicts an example computer, according to some embodiments. A computer 900 includes a processor 901 (possibly including multiple processors, multiple cores, multiple nodes, and/or implementing multi-threading, etc.). The computer 900 includes a memory 907. The memory 907 may be system memory or any one or more of the above already described possible realizations of machine-readable media. The computer 900 also includes a bus 903 and a network interface 905.

The system also includes a signal processor 911. The signal processor 911 may perform one or more operations depicted in FIGS. 7-8. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for sealed material evaluation using acoustic measurements as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: A method comprising emitting outward, from a position within a casing of a wellbore that includes a sealing material positioned between the casing and a subsurface formation in which the wellbore is formed, an acoustic waveform; detecting, by a detector positioned within the casing of the wellbore, a return waveform generated in response to the acoustic waveform interacting with a region of interest that includes at least a portion of the sealing material; determining a first time window of the return waveform associated with the region of interest; trimming the return waveform based on the first time window; determining a first spectral power density for the first time window of the trimmed return waveform; and determining a composition ratio value for the region of interest based on the first spectral power density.

Embodiment 2: The method of Embodiment 1, wherein determining the composition ratio value comprises determining a quality index value of the region of interest based on the first spectral power density; and determining the composition ratio value for the region of interest based on the quality index value.

Embodiment 3: The method of Embodiments 1 or 2, wherein determining the composition ratio value comprises correlating quality index values for the region of interest with composition ratio values for the region of interest based on a model waveform.

Embodiment 4: The method of Embodiment 3, wherein correlating the quality index values for the region of interest with the composition ratio values for the region of interest comprises determining a quality index value for each value of the composition ratio values across a range of the composition ratio values for the region of interest based on model waveforms.

Embodiment 5: The method of Embodiment 4, wherein determining the quality index value for each value of the composition ratio values comprises determining the quality index value based on the model waveform and a reference material.

Embodiment 6: The method of any one of Embodiments 1-5, wherein determining the first time window comprises defining a virtual interface within the subsurface formation; determining a maximum time for the return waveform based on a distance between the detector and the virtual interface; determining an out-of-interest time based on the maximum time and a geometry of the wellbore; and determining an offset time for the return waveform based on a property of the casing, wherein the first time window is based on the offset time and the out-of-interest time.

Embodiment 7: The method of Embodiment 6, further comprising determining a second spectral power density for a second time window of the trimmed return waveform, wherein the second time window is based on the offset time and the maximum time; and determining a quality index value for the region of interest based on the first spectral power density and the second spectral power density, wherein the quality index value is a ratio of the first spectral power density to the second spectral power density.

Embodiment 8: The method of any one of Embodiments 1-7, wherein emitting outward, from the position within the casing of the wellbore comprises emitting outward, from a position within a production tubing that is positioned within the casing of the wellbore, the acoustic waveform, and wherein the detector is positioned within the production tubing.

Embodiment 9: The method of Embodiment 8, wherein the first time window is based on a property of at least one of the production tubing, the casing, and the wellbore.

Embodiment 10: The method of any one of Embodiments 1-9, further comprising performing a wellbore operation, in response to a determination that the composition ratio value for the region of interest does not exceed a threshold.

Embodiment 11: A system comprising an emitter to be positioned within a production tubing located in a casing of a wellbore that includes a sealing material positioned between the casing and a subsurface formation in which the wellbore is formed, wherein the emitter is to emit an acoustic waveform outward toward the subsurface formation; a detector that is to detect a return waveform generated in response to the acoustic waveform interacting with a region of interest of the sealing material in an annulus between the casing and the subsurface formation; a processor; and a computer-readable medium having instructions stored thereon that are executable by the processor to cause the system to: determine a first time window associated of the returned waveform associated with the region of interest; trim the return waveform based on the first time window; determine a first spectral power density for the first time window of the trimmed return waveform; and determine a composition ratio value for the region of interest based on the first spectral power density.

Embodiment 12: The system of Embodiment 11, wherein the instructions executable by the processor to cause the system to determine the composition ratio value comprise instructions executable by the processor to cause the system to: determine a quality index value of the region of interest based on the first spectral power density; and determine the composition ratio value for the region of interest based on the quality index value.

Embodiment 13: The system of Embodiments 11 or 12, wherein determining the first time window comprises: defining a virtual interface within the subsurface formation; determining a maximum time for the return waveform based on a distance between the detector and the virtual interface; determining an out-of-interest time based on the maximum time and a geometry of the wellbore; and determining an offset time for the return waveform based on a property of the casing, wherein the first time window is based on the offset time and the out-of-interest time.

Embodiment 14: The system of Embodiment 13, further comprising determining a second spectral power density for a second time window, wherein the second time window is based on the offset time and the maximum time; and determining a quality index value for the region of interest based on the first spectral power density and the second spectral power density, wherein the quality index value is a ratio of the first spectral power density and the second spectral power density.

Embodiment 15: The system of any one of Embodiments 11-14, wherein the instructions executable by the processor to cause the system to determine the composition ratio value comprise instructions executable by the processor to cause the system to correlate quality index values for the region of interest with composition ratio values for the region of interest.

Embodiment 16: The system of Embodiment 15, wherein the quality index values for the region of interest are determined based on a model waveform and a range of composition ratio values for the region of interest, wherein the region of interest comprises at least one of a reference material and the sealing material, wherein each composition ratio value of the range of composition ratio values comprises a ratio of an amount of the reference material to an amount of the sealing material in the region of interest.

Embodiment 17: A non-transitory, computer-readable medium having instructions stored thereon that are executable by a processor to perform operations comprising determining a first time window of a return waveform associated with a region of interest that includes at least a portion of a sealing material positioned between a casing of a wellbore and a subsurface formation in which the wellbore is formed, wherein the return waveform is generated in response to an acoustic waveform being emitted from a position within a production tubing that is within the casing; trimming the return waveform based on the first time window; determining a first spectral power density of the trimmed waveform; and determining a composition ratio value for the region of interest based on the first spectral power density.

Embodiment 18: The non-transitory, computer-readable medium of Embodiment 17, wherein determining the composition ratio value comprises determining a quality index value for the region of interest based on the first spectral power density and based on quality index values correlated with composition ratio values across a range of composition ratio values, wherein the composition ratio value for the region of interest is based on the quality index value.

Embodiment 19: The non-transitory, computer-readable medium of Embodiment 18, wherein determining the composition ratio value comprises determining a second spectral power density of the trimmed waveform, wherein the quality index value is a ratio of the first spectral power density to the second spectral power density.

Embodiment 20: The non-transitory, computer-readable medium of any one of Embodiments 17-19, wherein the first time window is based on a property of at least one of the production tubing and the casing, wherein the property of at least one of the production tubing and the casing comprises at least one of a density, an inner diameter, an outer diameter, and a sound velocity.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   emitting outward, from a position within a casing of a wellbore that includes a sealing material positioned between the casing and a subsurface formation in which the wellbore is formed, an acoustic waveform;
   detecting, by a detector positioned within the casing of the wellbore, a return waveform generated in response to the acoustic waveform interacting with a region of interest that includes at least a portion of the sealing material;
   determining a first time window of the return waveform associated with the region of interest, wherein determining the first time window comprises:
      defining a virtual interface within the subsurface formation,
      determining a maximum time for the return waveform based on a distance between the detector and the virtual interface,
      determining an out-of-interest time based on the maximum time and a geometry of the wellbore, and
      determining an offset time for the return waveform based on a property of the casing, wherein the first time window is based on the offset time and the out-of-interest time;
   trimming the return waveform based on the first time window;
   determining a first spectral power density for the first time window of the trimmed return waveform; and
   determining a composition ratio value for the region of interest based on the first spectral power density.

2. The method of claim 1, wherein determining the composition ratio value comprises:
   determining a quality index value of the region of interest based on the first spectral power density; and
   determining the composition ratio value for the region of interest based on the quality index value.

3. The method of claim 1, wherein determining the composition ratio value comprises:
   correlating a set of quality index values for the region of interest with a range of composition ratio values for the region of interest based on model waveforms.

4. The method of claim 3, wherein correlating the quality index values for the region of interest with the composition ratio values for the region of interest comprises:
   determining a quality index value for each value of the composition ratio values across a range of the composition ratio values for the region of interest based on the model waveforms.

5. The method of claim 4, wherein determining the quality index value for each value of the composition ratio values comprises determining the quality index value based on the model waveforms and a reference material.

6. The method of claim 1, further comprising:
   determining a second spectral power density for a second time window of the trimmed return waveform,
      wherein the second time window is based on the offset time and the maximum time; and
   determining a quality index value for the region of interest based on the first spectral power density and the second spectral power density,
      wherein the quality index value is a ratio of the first spectral power density to the second spectral power density.

7. The method of claim 1,
   wherein emitting outward, from the position within the casing of the wellbore comprises emitting outward, from a position within a production tubing that is positioned within the casing of the wellbore, the acoustic waveform, and
   wherein the detector is positioned within the production tubing.

8. The method of claim 7, wherein the first time window is based on a property of at least one of the production tubing, the casing, and the wellbore.

9. The method of claim 1, further comprising:
   performing a wellbore operation in response to a determination that the composition ratio value for the region of interest does not exceed a threshold.

10. A system comprising:
    an emitter to be positioned within a production tubing located in a casing of a wellbore that includes a sealing material positioned between the casing and a subsurface formation in which the wellbore is formed, wherein the emitter is to emit an acoustic waveform outward toward the subsurface formation;
    a detector that is to detect a return waveform generated in response to the acoustic waveform interacting with a region of interest of the sealing material in an annulus between the casing and the subsurface formation;
    a processor; and
    a computer-readable medium having instructions stored thereon that are executable by the processor to cause the system to,
       determine a first time window associated of the returned waveform associated with the region of interest, wherein determining the first time window comprises:
          defining a virtual interface within the subsurface formation;
          determining a maximum time for the return waveform based on a distance between the detector and the virtual interface;
          determining an out-of-interest time based on the maximum time and a geometry of the wellbore; and
          determining an offset time for the return waveform based on a property of the casing, wherein the first time window is based on the offset time and the out-of-interest time;
       trim the return waveform based on the first time window;

determine a first spectral power density for the first time window of the trimmed return waveform; and
determine a composition ratio value for the region of interest based on the first spectral power density.

11. The system of claim 10, wherein the instructions executable by the processor to cause the system to determine the composition ratio value comprise instructions executable by the processor to cause the system to:
determine a quality index value of the region of interest based on the first spectral power density; and
determine the composition ratio value for the region of interest based on the quality index value.

12. The system of claim 10, further comprising:
determining a second spectral power density for a second time window,
wherein the second time window is based on the offset time and the maximum time; and
determining a quality index value for the region of interest based on the first spectral power density and the second spectral power density,
wherein the quality index value is a ratio of the first spectral power density and the second spectral power density.

13. The system of claim 10, wherein the instructions executable by the processor to cause the system to determine the composition ratio value comprise instructions executable by the processor to cause the system to:
correlate a set of quality index values for the region of interest with a range of composition ratio values for the region of interest.

14. The system of claim 13,
wherein the quality index values for the region of interest are determined based on a model waveform and a range of composition ratio values for the region of interest,
wherein the region of interest comprises at least one of a reference material and the sealing material,
wherein each composition ratio value of the range of composition ratio values comprises a ratio of an amount of the reference material to an amount of the sealing material in the region of interest.

15. A non-transitory, computer-readable medium having instructions stored thereon that are executable by a processor to perform operations comprising:
determining a first time window of a return waveform associated with a region of interest that includes at least a portion of a sealing material positioned between a casing of a wellbore and a subsurface formation in which the wellbore is formed, wherein the return waveform is generated in response to an acoustic waveform being emitted from a position within a production tubing that is within the casing, and
wherein determining the first time window comprises:
defining a virtual interface within the subsurface formation,
determining a maximum time for the return waveform based on a distance between the detector and the virtual interface,
determining an out-of-interest time based on the maximum time and a geometry of the wellbore, and
determining an offset time for the return waveform based on a property of the casing, wherein the first time window is based on the offset time and the out-of-interest time;
trimming the return waveform based on the first time window;
determining a first spectral power density of the trimmed return waveform; and
determining a composition ratio value for the region of interest based on the first spectral power density.

16. The non-transitory, computer-readable medium of claim 15, wherein determining the composition ratio value comprises:
determining a quality index value for the region of interest based on the first spectral power density and based on quality index values correlated with composition ratio values across a range of composition ratio values,
wherein the composition ratio value for the region of interest is based on the quality index value.

17. The non-transitory, computer-readable medium of claim 16, wherein determining the composition ratio value comprises:
determining a second spectral power density of the trimmed return waveform,
wherein the quality index value is a ratio of the first spectral power density to the second spectral power density.

18. The non-transitory, computer-readable medium of claim 15,
wherein the first time window is based on a property of at least one of the production tubing and the casing,
wherein the property of at least one of the production tubing and the casing comprises at least one of a density, an inner diameter, an outer diameter, and a sound velocity.

* * * * *